US011355964B2

United States Patent
Yang et al.

(10) Patent No.: US 11,355,964 B2
(45) Date of Patent: Jun. 7, 2022

(54) WIRELESS CHARGING RECEIVING APPARATUS, TRANSMITTING APPARATUS, AND SYSTEM OF TERMINAL

(71) Applicant: Huawei Digital Power Technologies Co., Ltd., Shenzhen (CN)

(72) Inventors: Songnan Yang, Shenzhen (CN); Xiaoqing Hu, Shenzhen (CN); Bing Cai, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 16/721,310

(22) Filed: Dec. 19, 2019

(65) Prior Publication Data

US 2020/0127493 A1    Apr. 23, 2020

Related U.S. Application Data

(63) Continuation of application No. PCT/CN2018/074186, filed on Jan. 25, 2018.

(30) Foreign Application Priority Data

Jun. 20, 2017    (CN) .......................... 201710471936.6

(51) Int. Cl.
*H02J 7/00*       (2006.01)
*H02J 50/10*      (2016.01)
(Continued)

(52) U.S. Cl.
CPC .............. *H02J 50/10* (2016.02); *H01F 38/14* (2013.01); *H02J 7/02* (2013.01); *H04M 1/0264* (2013.01); *H04M 2201/08* (2013.01)

(58) Field of Classification Search
USPC .......................... 320/106, 107, 108, 109, 110
See application file for complete search history.

(56) References Cited

U.S. PATENT DOCUMENTS

| 2012/0248883 | A1  |   | 10/2012 | Konanur et al. | |
|---|---|---|---|---|---|
| 2014/0143933 | A1 | * | 5/2014 | Low | ........................ H02J 7/025 2/170 |

(Continued)

FOREIGN PATENT DOCUMENTS

| CN | 103107008 | A | * | 5/2013 | ......... H01F 27/2871 |
|---|---|---|---|---|---|
| CN | 103308949 | A |   | 9/2013 | |

(Continued)

*Primary Examiner* — Brian Ngo
(74) *Attorney, Agent, or Firm* — Womble Bond Dickinson (US) LLP (57) ABSTRACT

A wireless charging receiving apparatus of a mobile terminal. The wireless charging receiving apparatus is configured to be disposed inside the mobile terminal and close to a metal rear housing (3) of the mobile terminal, and includes two interconnected coils (701,702). The two coils (701,702) are located in a same plane and are connected in series, and winding directions of the two coils (701,702) are opposite, so that directions of magnetic fluxes generated by the two coils (701,702) on the metal rear housing (3) are opposite, thereby resolving a problem of an eddy current on the metal rear housing of the mobile terminal such as a smartphone including a wireless charging system, and reducing a temperature of a metal body and reducing an energy loss without forming a hole or a seam on the metal rear housing.

20 Claims, 6 Drawing Sheets

(51) Int. Cl.
  *H01F 38/14* (2006.01)
  *H02J 7/02* (2016.01)
  *H04M 1/02* (2006.01)

(56) References Cited

U.S. PATENT DOCUMENTS

| | | |
|---|---|---|
| 2014/0232334 A1 | 8/2014 | Konanur et al. |
| 2016/0238731 A1 | 8/2016 | Chopra et al. |
| 2016/0241061 A1 | 8/2016 | Werner et al. |
| 2016/0282499 A1 | 9/2016 | Miyamoto |
| 2016/0285317 A1 | 9/2016 | Maniktala |
| 2017/0063128 A1 | 3/2017 | Van Bosch et al. |
| 2019/0115647 A1 | 4/2019 | Zhao et al. |

FOREIGN PATENT DOCUMENTS

| | | | | |
|---|---|---|---|---|
| CN | 104756357 A | * | 7/2015 | ......... H01F 27/2871 |
| CN | 105006654 A | | 10/2015 | |
| CN | 105119035 A | | 12/2015 | |
| CN | 105119036 A | | 12/2015 | |
| CN | 103444051 B | | 9/2016 | |
| CN | 106101339 A | | 11/2016 | |
| CN | 106205986 A | | 12/2016 | |
| CN | 107370243 A | | 11/2017 | |
| CN | 107370243 A | * | 11/2017 | ............. H02J 50/10 |
| EP | 3131208 A1 | | 2/2017 | |
| JP | 5286445 B1 | * | 9/2013 | ............. B60L 53/39 |
| JP | 2014126513 A | * | 7/2014 | |
| KR | 20150090179 A | * | 8/2015 | ............. H02J 7/025 |
| WO | 2015067854 A1 | | 5/2015 | |
| WO | 2016133628 A1 | | 8/2016 | |

* cited by examiner

WIRELESS CHARGING RECEIVING APPARATUS, TRANSMITTING APPARATUS, AND SYSTEM OF TERMINAL

CROSS-REFERENCE TO RELATED APPLICATION

This application is a continuation application of international patent application number PCT/CN2018/074186, filed on Jan. 25, 2018, which claims priority to Chinese Patent Application No. 201710471936.6, filed on Jun. 20, 2017, the disclosures of which are incorporated herein by reference in their entireties.

TECHNICAL FIELD

Embodiments of the present invention relate to the wireless charging field, and more specifically, to a wireless charging receiving apparatus or transmitting apparatus, or system of a mobile terminal.

BACKGROUND

Figure 1:
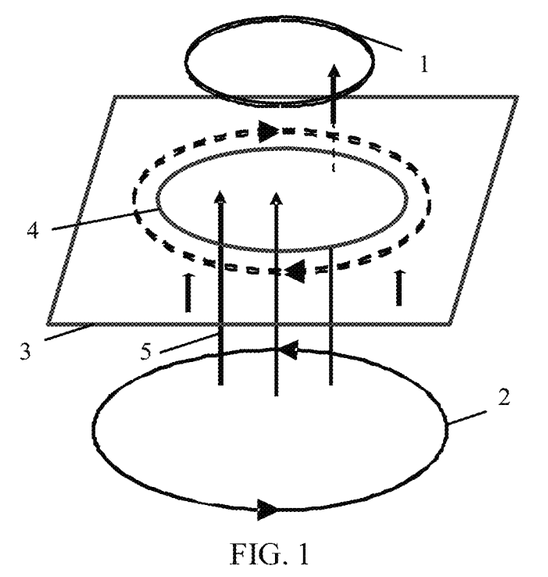
FIG. 1 is a schematic diagram of a magnetic circuit of a wireless charging system of a mobile terminal in the prior art.

Mobile terminals are handheld mobile devices and are widely used. A rear housing of a mobile terminal is certainly a part in contact with a palm for a longest time. A metal rear housing has the following advantages: The metal rear housing has good quality, a good touch feel, and is relatively easy to be integrally molded. A metal material has both abrasion resistance and falling resistance. The metal rear housing is only deformed when suffering a strong crash, but cannot shatter as easily as glass. However, for a mobile terminal having a metal rear housing and the metal rear housing including a wireless charging system, for example, a smartphone, a wireless charging receiving coil needs to be mounted in the smartphone. The wireless charging receiving coil is configured to receive an electromagnetic wave generated by a wireless charging transmitting coil on a wireless charger, to charge the smartphone. However, the metal rear housing affects a signal of the smartphone, and a high frequency magnetic field cannot penetrate the metal rear housing. Therefore, a hole or a seam needs to be specially formed on the rear housing, and a supporting strength and aesthetic appearance of the metal rear housing are reduced. In addition, a diameter of an acceptable hole formed on the rear housing of the smartphone is excessively small for a conventional coil design. Coupling between the wireless charging transmitting coil and the wireless charging receiving coil mounted in the smartphone is insufficient, resulting in low power transmission efficiency. Meanwhile, for a working frequency (100 KHz to 200 KHz) of coupled wireless charging, the metal rear housing generates an eddy current (as shown in FIG. 1) due to a magnetic field generated by the wireless charging transmitting coil. Consequently, the metal rear housing rapidly generates heat, resulting in an energy loss and severely affecting user experience.

SUMMARY

Embodiments of the present invention provide a wireless charging receiving apparatus, transmitting apparatus, and system of a mobile terminal. Two coils generating electromagnetic induction are configured as interconnected coils, the two coils are located in a same plane and are connected in series, and winding directions of the two coils are opposite, so that directions of magnetic fields generated by the two coils are opposite, thereby resolving a problem of an eddy current on a metal rear housing of the mobile terminal such as a smartphone including the wireless charging system, and reducing a temperature of a metal body and reducing an energy loss without forming a hole or a seam on the metal rear housing.

According to a first aspect, an embodiment of the present invention provides a wireless charging receiving apparatus of a mobile terminal, configured to be disposed inside the mobile terminal and close to a metal rear housing of the mobile terminal, where the wireless charging receiving apparatus includes two interconnected coils, the two coils are located in a same plane and are connected in series, and winding directions of the two coils are opposite, so that directions of magnetic fluxes generated by the two coils on the metal rear housing are opposite.

The two coils are configured as interconnected coils. The two coils are located in the same plane and are connected in series, and the winding directions of the two coils are opposite, so that directions of magnetic fields generated by the two coils are opposite. Therefore, magnetic fluxes generated on the metal rear housing counterbalance each other, to reduce or eliminate an eddy current on the metal rear housing. Therefore, a temperature of the metal rear housing can be reduced when no seam is formed on the metal rear housing, and an energy loss is reduced while a mechanical supporting degree of a metal body is ensured. In this solution, a wireless charging coil having a butterfly structure or a figure-8 structure may be used.

In one embodiment of the first aspect, magnetic fluxes of magnetic fields generated by the two coils on the metal rear housing are the same, so that a total magnetic flux passing through the metal rear housing is zero.

Directions of the magnetic fields generated by the two coils are opposite and magnitude of the magnetic fields is the same. Therefore, the magnetic fluxes generated on the metal rear housing counterbalance each other, to eliminate eddy currents generated by the two coils on the metal rear housing. Therefore, a temperature of the metal rear housing can be reduced when no seam is formed on the metal rear housing, and an energy loss is reduced while a mechanical supporting degree of a metal body is ensured.

In one embodiment of the first aspect, the plane in which the two coils are located is parallel to the metal rear housing.

According to a second aspect, an embodiment of the present invention provides a mobile terminal, including a wireless charging receiving apparatus, where the wireless charging receiving apparatus is disposed inside the mobile terminal and close to a metal rear housing of the mobile terminal, the wireless charging receiving apparatus includes two interconnected coils, the two coils are located in a same plane and are connected in series, and winding directions of the two coils are opposite, so that directions of magnetic fluxes generated by the two coils on the metal rear housing are opposite.

In one embodiment of the second aspect, the mobile terminal further includes a dual camera, one of the two coils surrounds one camera of the dual camera, and the other coil surrounds the other camera of the dual camera.

In one embodiment of the second aspect, the mobile terminal further includes a dual camera, and the two coils separately surround one of the two cameras.

In one embodiment of the second aspect, the mobile terminal further includes at least two of three components: a camera flash, a fingerprint recognition apparatus, or a camera; one of the two coils surrounds one of the three components: the camera flash, the fingerprint recognition apparatus, or the camera on the metal rear housing; and the other coil surrounds one of remaining two of the camera flash, the fingerprint recognition apparatus, or the camera, so that the two coils generate electromagnetic induction due to a magnetic field of the mobile terminal entering through a position of the camera flash, or the fingerprint recognition apparatus, or the camera.

In one embodiment of the second aspect, the plane in which the two coils are located is parallel to the metal rear housing, and the two coils separately surround two components of the camera flash, the fingerprint recognition apparatus, or the camera on the metal rear housing, where a distance between the two components is smaller than distances between other two components of the three components, so that the two coils generate electromagnetic induction with a magnetic field generated by a wireless charging transmitting apparatus that charges the mobile terminal.

In one embodiment of the second aspect, a total magnetic flux generated by the two coils at a position of the metal rear housing of the mobile terminal other than the position at which the camera flash, or the fingerprint recognition apparatus, or the camera is disposed is zero, to eliminate an eddy current generated when the magnetic field generated by the wireless charging transmitting apparatus penetrates the metal rear housing.

In one embodiment of the second aspect, the two coils are identical coils.

The coils are disposed at the position of the camera flash, or the fingerprint recognition apparatus, or the camera. There is no need to form another hole at another position of the metal rear housing, thereby reducing a quantity of holes.

At the position of the camera flash, or the fingerprint recognition apparatus, or the camera, an electromagnetic signal is no longer shielded by the metal rear housing, and electromagnetic induction efficiency is high.

The two coils are configured as identical coils, so that a manufacturing process may be simplified, and a total magnetic flux of zero may be easily and conveniently achieved under magnetic fields. The two coils may alternatively be coils having different shapes or winding quantities, provided that the magnetic fluxes generated by the two coils are the same. In this solution, a wireless charging coil having a butterfly structure or a figure-8 structure may be used.

According to a third aspect, an embodiment of the present invention provides a wireless charging transmitting apparatus of a mobile terminal, including a transmitting coil, where the transmitting coil includes two interconnected coils, the two coils are located in a same plane and are connected in series, winding directions of the two coils are opposite, and when a current flows through the two coils connected in series with each other, directions of magnetic fields generated by the two coils are opposite, so that when the wireless charging transmitting apparatus of the mobile terminal charges the mobile terminal, directions of magnetic fluxes passing through a metal rear housing of the mobile terminal are opposite.

In one embodiment of the third aspect, magnetic fluxes of the magnetic fields generated by the two coils on the metal rear housing are the same.

In one embodiment of the third aspect, the two coils are identical coils.

According to a fourth aspect, an embodiment of the present invention provides a wireless charging system of a mobile terminal, including a receiving apparatus and a transmitting apparatus, where the transmitting apparatus is disposed on a wireless charger, and the receiving apparatus is disposed inside the mobile terminal;

the receiving apparatus and the transmitting apparatus each include two interconnected coils, the two interconnected coils are located in a same plane and are connected in series, and winding directions of the two interconnected coils are opposite; and when a current flows through the two coils connected in series with each other, directions of magnetic fields generated by the two coils are opposite, so that directions of magnetic fluxes of the magnetic fields generated by the two interconnected coils of the receiving apparatus on a metal rear housing of the mobile terminal are opposite, and directions of magnetic fluxes of the magnetic fields generated by the two interconnected coils of the transmitting apparatus on the metal rear housing of the mobile terminal are opposite.

In one embodiment of the fourth aspect, magnetic fluxes of the magnetic fields generated by the two interconnected coils on the metal rear housing are the same.

In one embodiment of the fourth aspect, electromagnetic induction is generated between the two interconnected coils of the receiving apparatus and the two interconnected coils of the transmitting apparatus.

In one embodiment of the fourth aspect, the mobile terminal further includes at least two of three components: a camera flash, a fingerprint recognition apparatus, or a camera; one of the two coils surrounds one of the three components: the camera flash, the fingerprint recognition apparatus, or the camera on the metal rear housing; and the other coil surrounds one of remaining two of the camera flash, the fingerprint recognition apparatus, or the camera, so that the two coils generate electromagnetic induction due to a magnetic field of the mobile terminal entering through a position of the camera flash, or the fingerprint recognition apparatus, or the camera.

In one embodiment of the fourth aspect, the plane in which the two coils are located is parallel to the metal rear housing, and the two coils separately surround two of the camera flash, the fingerprint recognition apparatus, or the camera on the metal rear housing, where a distance between the two components is one of two smaller distances between the three components, so that the two coils generate electromagnetic induction with a magnetic field generated by a wireless charging transmitting apparatus that charges the mobile terminal.

In one embodiment of the fourth aspect, the mobile terminal further includes a dual camera, one of the two coils surrounds one camera of the dual camera, and the other coil surrounds the other camera of the dual camera.

In one embodiment of the present invention, the two coils generating electromagnetic induction are configured as interconnected coils, the two coils are located in the same plane and are connected in series, and the winding directions of the two coils are opposite, so that the directions of the magnetic fields generated by the two coils are opposite, thereby resolving a problem of an eddy current on the metal rear housing of the mobile terminal such as a smartphone including the wireless charging system, and reducing a temperature of a metal body and reducing an energy loss without forming a hole or a seam on the metal rear housing. Specially, the directions of the magnetic fields generated by the two coils are opposite and magnitude of the magnetic fields is the same, so that the magnetic fluxes generated on the metal rear housing counterbalance each other, to eliminate eddy currents generated by the two coils on the metal rear housing.

Reference numerals in the accompanying drawings are explained as follows: 1: a coil in a receiving apparatus in the prior art; 2: a coil in a transmitting apparatus in the prior art; 3: a metal rear housing; 4: a hole of a metal rear housing; 5: a magnetic line; 6: a coil in a wireless charging receiving apparatus in the present invention; 7: a structure of a coil 10 of a transmitting apparatus or a coil 6 in a receiving apparatus in an embodiment of the present invention, where the structure includes a coil 701 and a coil 702; 701: a coil 1 in an embodiment of the present invention; 702: a coil 2 in an embodiment of the present invention; 801: a camera 1; 802: a camera 2; 9: a mobile phone having a dual camera and integrating a wireless charging coil; 10: a coil in a wireless charging transmitting apparatus in an embodiment of the present invention.

DESCRIPTION OF EMBODIMENTS

The following clearly describes the technical solutions in the embodiments of the present invention with reference to the accompanying drawings in the embodiments of the present invention.

It should be understood that a mobile terminal in the embodiments of the present invention may be applied to various charging scenarios. The mobile terminal is neither limited to a smartphone, a tablet computer, and a wearable device, nor limited to various mobile terminal devices such as an electric automobile. This is not limited in the embodiments of the present invention.

Figure 2:
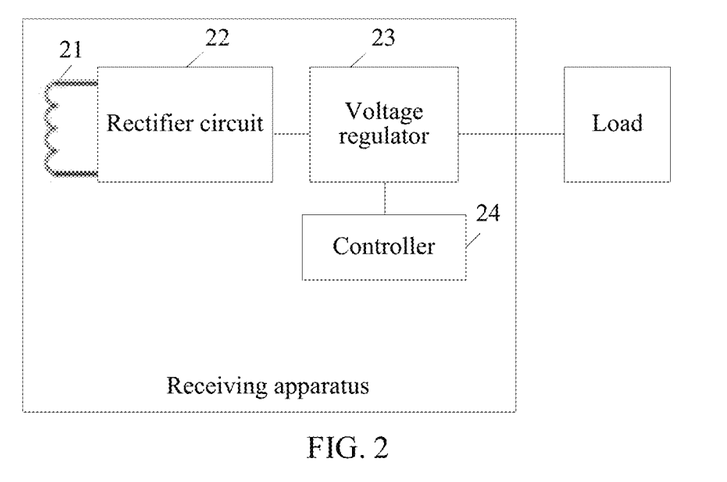
FIG. 2 is a schematic diagram of a wireless charging receiving apparatus of a mobile terminal according to an embodiment of the present invention.

As shown in FIG. 2, in some embodiments of the present invention, a wireless charging receiving apparatus of a mobile terminal is provided. The receiving apparatus may include a wireless charging receiving coil 21, a rectifier circuit 22, a voltage regulator 23, and a controller 24. The wireless charging receiving coil 21 generates electric energy in a magnetic field generated by a wireless charging transmitting apparatus, and finally outputs a voltage to a load after regulation performed by the rectifier circuit 22 and the voltage regulator 23 under control of the controller 24. The receiving apparatus is disposed inside a mobile terminal device, for example, disposed inside a mobile phone.

Figure 3:
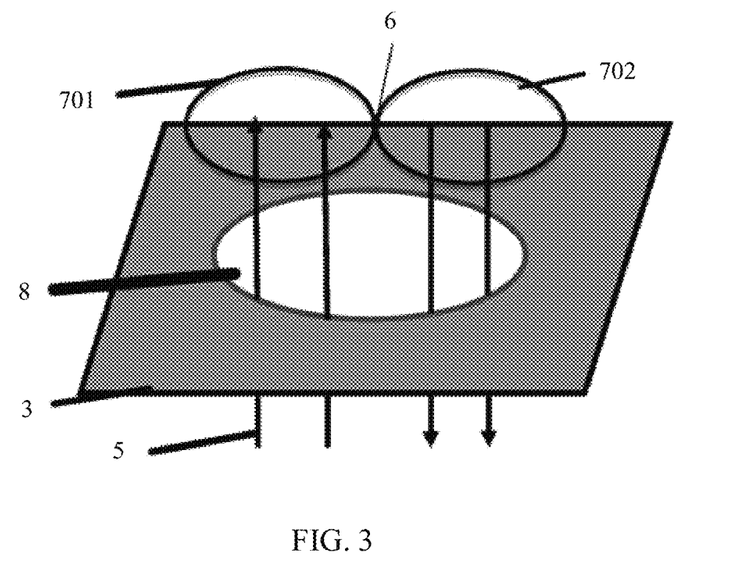
FIG. 3 is a schematic diagram of a magnetic circuit of a wireless charging receiving coil in a wireless charging receiving apparatus of a mobile terminal according to an embodiment of the present invention.

FIG. 3 is a schematic diagram of a magnetic circuit of a wireless charging receiving coil in a wireless charging receiving apparatus of a mobile terminal according to an embodiment of the present invention. The wireless charging receiving apparatus is disposed inside the mobile terminal and close to a metal rear housing 3 of the mobile terminal, and includes a wireless charging coil 6 including two interconnected coils in this embodiment of the present invention. The two interconnected coils included in the coil 6 are coils 701 and 702. The coils 701 and 702 are located in a same plane and are connected in series, and winding directions of the two coils 701 and 702 are opposite, so that directions of magnetic fluxes generated by the two coils 701 and 702 on the metal rear housing 3 are opposite. The two coils 701 and 702 are configured as interconnected coils. The two coils 701 and 702 are located in the same plane and are connected in series, and the winding directions of the two coils 701 and 702 are opposite, so that directions of magnetic fields generated by the two coils 701 and 702 are opposite. Therefore, magnetic fluxes generated on the metal rear housing 3 counterbalance each other, to reduce or eliminate an eddy current on the metal rear housing 3. Therefore, a temperature of the metal rear housing 3 can be reduced when no seam is formed on the metal rear housing, and an energy loss is reduced while a mechanical supporting degree of a metal body is ensured.

Specially, magnetic fluxes of the magnetic fields generated by the two coils 701 and 702 on the metal rear housing 3 are the same, so that a total magnetic flux passing through the metal rear housing 3 is zero. The directions of the magnetic fields generated by the two coils 701 and 702 are opposite and magnitude of the magnetic fields is the same. Therefore, the magnetic fluxes generated on the metal rear housing 3 counterbalance each other, to eliminate eddy currents generated by the two coils 701 and 702 on the metal rear housing 3. Therefore, the temperature of the metal rear housing 3 can be reduced when no seam is formed on the metal rear housing 3, and the energy loss is reduced while the mechanical supporting degree of the metal body is ensured.

The plane in which the two coils 701 and 702 are located is parallel to the metal rear housing 3. The two coils 701 and 702 are correspondingly disposed at a position that is parallel to a position of a camera flash, or a fingerprint recognition apparatus, or a camera on the metal rear housing 3, so that the two coils 701 and 702 generate electromagnetic induction with a magnetic line entering the mobile terminal from the position of the camera flash, or the fingerprint recognition apparatus, or the camera. The coils are disposed at the position of the camera flash, or the fingerprint recognition apparatus, or the camera. There is no need to form another hole at another position of the metal rear housing 3, thereby reducing a quantity of holes.

Figure 5:
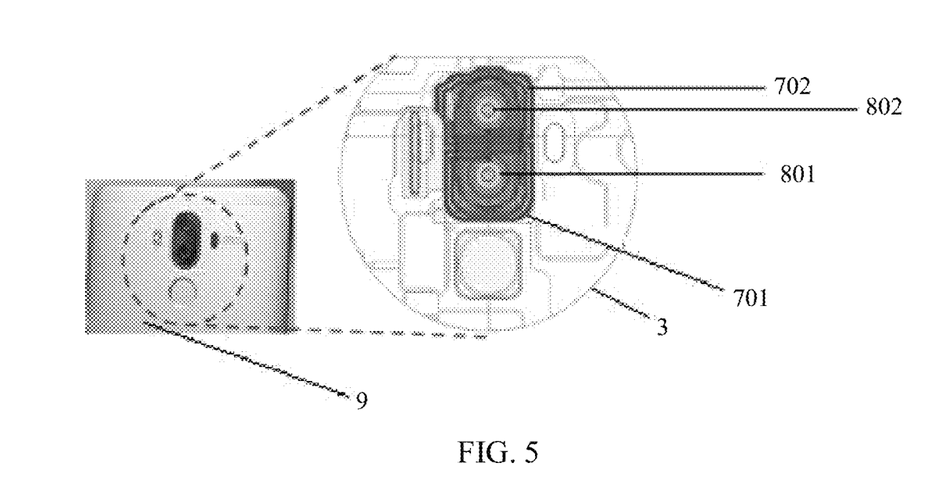
FIG. 5 is a schematic structural diagram of a mobile terminal provided with a wireless charging coil according to another embodiment of the present invention.

Specially, as shown in FIG. 5, the two coils 701 and 702 are disposed at the camera on the metal rear housing 3 of the mobile terminal. In addition, when the camera is a dual camera, for a mobile phone 9 having a dual camera including a camera 801 and a camera 802 and integrating a wireless charging coil 7, one of the two coils surrounds one camera of the dual camera, and the other coil surrounds the other camera of the dual camera. In addition, the two coils 701 and 702 are parallel to a plane in which the dual camera is located. In a case of the dual camera, each of the two coils 701 and 702 is disposed at a camera, so that the two coils 701 and 702 generate electromagnetic induction with a coil of a wireless charger.

The two coils 701 and 702 generate, through the position of the camera flash, or the fingerprint recognition apparatus, or the camera, electromagnetic induction with a magnetic field generated by a wireless charging transmitting apparatus of the mobile terminal. At the position of the camera flash, or the fingerprint recognition apparatus, or the camera, an electromagnetic signal is no longer shielded by the metal rear housing 3, and electromagnetic induction efficiency is high. The two coils 701 and 702 generate, through a position of the dual camera, electromagnetic induction with the magnetic field generated by the wireless charging transmitting apparatus of the mobile terminal. A total magnetic flux generated by the two coils 701 and 702 at a position of the metal rear housing 3 of the mobile terminal other than the position at which the camera flash, or the fingerprint recognition apparatus, or the camera is disposed is zero.

In this application, a wireless charging coil having a butterfly structure or a figure-8 structure may be used. The butterfly structure or the figure-8 structure is a structure in which two single toroid coils intersect. Each toroid coil may be of various shapes, such as a ring shape, an oval shape, or a rectangular shape. The shape of the single toroid coil is not limited herein. In some scenarios, the two coils 701 and 702 are configured as identical coils. The two coils 701 and 702 are configured as identical coils, so that a manufacturing process may be simplified, and a total magnetic flux of zero may be easily and conveniently achieved under magnetic fields. The two coils 701 and 702 may alternatively be coils having different shapes or winding quantities, provided that magnetic fluxes generated by the two coils are the same.

The two coils 701 and 702 generating electromagnetic induction are configured as interconnected coils, the two coils 701 and 702 are located in a same plane and are connected in series, and winding directions of the two coils 701 and 702 are opposite, so that directions of magnetic fields generated by the two coils 701 and 702 are opposite, thereby resolving a problem of an eddy current on a metal rear housing 3 of a mobile terminal such as a smartphone including a wireless charging system, and reducing a temperature of a metal body and reducing an energy loss without forming a hole or a seam on the metal rear housing 3. Specially, the directions of the magnetic fields generated by the two coils 701 and 702 are opposite and magnitude of the magnetic fields is the same, so that the magnetic fluxes generated on the metal rear housing 3 counterbalance each other, to eliminate eddy currents generated by the two coils 701 and 702 on the metal rear housing 3.

Figure 4:
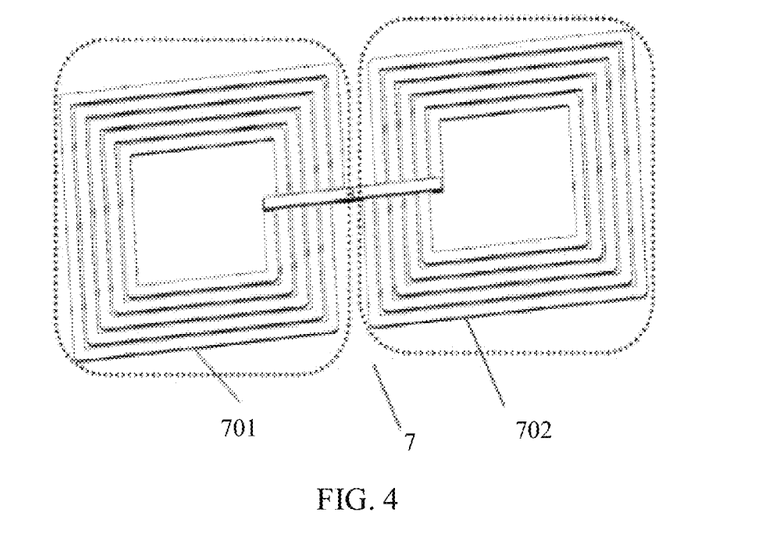
FIG. 4 is a schematic structural diagram of a wireless charging coil of a mobile terminal according to another embodiment of the present invention.

FIG. 4 shows a wireless charging coil that has a butterfly structure or a figure-8 structure according to some embodiments of this solution. The wireless charging coil is divided into two parts. A coil 701 is in a cross-connection to a coil 702, and a value of a magnetic flux generated by a current flowing through the coil 701 is equal to a value of a magnetic flux generated by the current flowing through the coil 702, but a direction of the magnetic flux generated by the current flowing through the coil 701 is opposite to a direction of the magnetic flux generated by the current flowing through the coil 702. When the magnetic fluxes affect a metal rear housing 3 of a charging device of a terminal, a total magnetic flux generated on the metal rear housing 3 is zero. In this solution, structures of a transmitting coil and a receiving coil are the same, and may be applied to a wireless charging receiving apparatus, transmitting apparatus, and system of a mobile terminal.

A shape of the wireless charging coil is interconnected coils. The two coils 701 and 702 are located in a same plane and are connected in series, and winding directions of the two coils 701 and 702 are opposite, so that directions of magnetic fields generated by the two coils 701 and 702 are opposite. Therefore, magnetic fluxes generated on the metal rear housing 3 counterbalance each other, to reduce or eliminate an eddy current on the metal rear housing 3. Therefore, a temperature of the metal rear housing 3 can be reduced when no seam is formed on the metal rear housing 3, and an energy loss is reduced while a mechanical supporting degree of a metal body is ensured. In this solution, the wireless charging coil having the butterfly structure or the figure-8 structure may be used. In one embodiment, a wireless charging coil may alternatively include two connected square coils. A structure of a single coil is not specifically limited, provided that values of the magnetic fluxes generated by the current flowing through the two coils 701 and 702 are the same and directions of the magnetic fluxes are opposite. When the two coils 701 and 702 are identical coils, a manufacturing process may be simplified, and a total magnetic flux of zero may be easily and conveniently achieved under the magnetic fields. The two coils 701 and 702 may alternatively be coils having different shapes or winding quantities, provided that the magnetic fluxes generated by the two coils are the same.

An application scenario of the wireless charging coil may be the wireless charging receiving apparatus, or transmitting apparatus, or system of the mobile terminal. Specifically, the plane in which the two coils 701 and 702 are located is parallel to the metal rear housing 3.

In the wireless charging receiving apparatus, the coils are disposed at a position of the camera flash, or a fingerprint recognition apparatus, or a camera. There is no need to form another hole at another position of the metal rear housing 3, thereby reducing a quantity of holes. The two coils 701 and 702 are disposed at the camera on the metal rear housing 3 of the mobile terminal. In addition, when the camera is a dual camera, the two coils 701 and 702 are separately disposed at a position of one of the two cameras, and the two coils 701 and 702 are parallel to a plane in which the dual camera is located. In a case of the dual camera, each of the two coils 701 and 702 is disposed at a camera, so that the two coils 701 and 702 generate electromagnetic induction with a coil of a wireless charger. At the position of the camera flash, or the fingerprint recognition apparatus, or the camera, an electromagnetic signal is no longer shielded by the metal rear housing 3, and electromagnetic induction efficiency is high.

An effect of using the wireless charging coil includes the following: The two coils 701 and 702 generating electromagnetic induction are configured as interconnected coils, the two coils 701 and 702 are located in the same plane and are connected in series, and the winding directions of the two coils 701 and 702 are opposite, so that the directions of the magnetic fields generated by the two coils 701 and 702 are opposite, thereby resolving a problem of an eddy current on the metal rear housing 3 of the mobile terminal such as a smartphone including a wireless charging system, and reducing the temperature of the metal body and reducing the energy loss without forming a hole or a seam on the metal rear housing 3. Specially, the directions of the magnetic fields generated by the two coils 701 and 702 are opposite and magnitude of the magnetic fields is the same, so that the magnetic fluxes generated on the metal rear housing 3 counterbalance each other, to eliminate eddy currents generated by the two coils 701 and 702 on the metal rear housing 3.

FIG. 5 is a schematic structural diagram of a mobile terminal provided with the wireless charging coil according to another embodiment of the present invention. A mobile terminal includes a wireless charging receiving apparatus. The wireless charging receiving apparatus is disposed inside the mobile terminal and close to a metal rear housing 3 of the mobile terminal. The wireless charging receiving apparatus includes two interconnected coils. In one embodiment, the mobile terminal further includes a dual camera. One of the two coils surrounds one camera of the dual camera, and the other coil surrounds the other camera of the dual camera. Using a mobile model MATE 9 shown in the figure as an example, when a dual camera 801 and 802 is disposed, to be specific, the coil 701 correspondingly surrounds the camera 801, and the coil 702 correspondingly surrounds the camera 802, the two coils 701 and 702 generate electromagnetic induction with a coil of a wireless charger. At a position of the camera, an electromagnetic signal is no longer shielded by the metal rear housing 3, and electromagnetic induction efficiency is high. The two coils 701 and 702 generate, through a position of the dual camera, electromagnetic induction with a magnetic field generated by a wireless charging transmitting apparatus of the mobile terminal. A total magnetic flux generated at a position other than the position of the camera is zero. The two coils 701 and 702 may be identical coils. A plane in which the two coils are located is parallel to the metal rear housing. A total magnetic flux generated by the two coils at a position on the metal rear housing of the mobile terminal other than a position at which a camera flash, or a fingerprint recognition apparatus, or a camera is disposed is zero, to eliminate a vortex generated when the magnetic field generated by the wireless charging transmitting apparatus penetrates the metal rear housing.

The two coils 701 and 702 are located in the same plane and are connected in series, and winding directions of the two coils are opposite, so that directions of magnetic fluxes generated by the two coils on the metal rear housing 3 are opposite. In one embodiment, the mobile terminal further includes at least two of three components: a camera flash, a fingerprint recognition apparatus, or a camera; one of the two coils surrounds one of the three components: the camera flash, the fingerprint recognition apparatus, or the camera on the metal rear housing; and the other coil surrounds one of remaining two of the camera flash, the fingerprint recognition apparatus, or the camera, so that the two coils generate electromagnetic induction due to a magnetic field of the mobile terminal entering through a position of the camera flash, or the fingerprint recognition apparatus, or the camera.

In one embodiment, the plane in which the two coils are located is parallel to the metal rear housing, and the two coils separately surround two of the camera flash, the fingerprint recognition apparatus, and the camera on the metal rear housing, where a distance between the two components is one of two smaller distances between the three components, so that the two coils generate electromagnetic induction with a magnetic field generated by a wireless charging transmitting apparatus that charges the mobile terminal.

Figure 6:
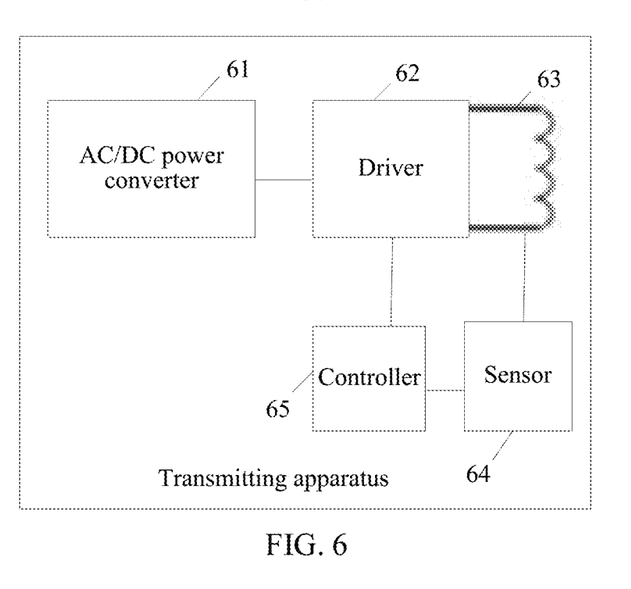
FIG. 6 is a schematic diagram of a wireless charging transmitting apparatus of a mobile terminal according to another embodiment of the present invention.
Figure 7:
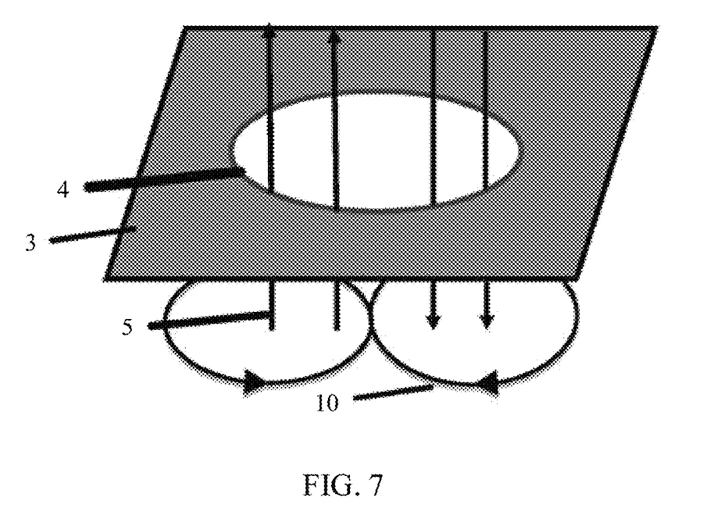
FIG. 7 is a schematic diagram of a magnetic circuit of a wireless charging transmitting apparatus of a mobile terminal according to another embodiment of the present invention.

FIG. 6 shows a wireless charging transmitting apparatus of a mobile terminal according to some embodiments of the present invention. The transmitting apparatus may include an AC/DC power converter 61, a driver 62, a transmitting coil 63, a sensor 64, and a controller 65. The AC/DC power converter 61 converts the main AC power into a direct current. The transmitting coil 63 is configured to generate electromagnetic induction with a coil in a wireless charging receiving apparatus, so that the coil in the wireless charging receiving apparatus generates electric energy in a magnetic field generated by the transmitting coil 63 of transmitting apparatus. FIG. 7 is a schematic diagram of a magnetic circuit of a wireless charging transmitting apparatus of a mobile terminal according to some embodiments of the present invention. A transmitting coil 10 includes two interconnected coils. The two coils are located in a same plane and are connected in series, and winding directions of the two coils are opposite. When a current flows through the two interconnected coils, directions of magnetic fields generated by the two coils are opposite, so that when the wireless charging transmitting apparatus of the mobile terminal charges the mobile terminal, directions of magnetic fluxes passing through a metal rear housing 3 of the mobile terminal are opposite, and magnetic fluxes of the magnetic fields generated by the two coils on the metal rear housing 3 are the same.

In some scenarios, the two coils may be identical coils, to simplify a manufacturing process, and easily ensure that the directions of the magnetic fields generated by the two coils are opposite and magnitude of the magnetic fields is the same, so that the magnetic fluxes generated on the metal rear housing 3 counterbalance each other.

The directions of the magnetic fields generated by the two coils of the transmitting apparatus are opposite and the magnitude of the magnetic fields is the same, so that the magnetic fluxes generated on the metal rear housing 3 counterbalance each other, thereby resolving a problem of an eddy current on the metal rear housing 3 of the mobile terminal such as a smartphone including a wireless charging system, and reducing a temperature of a metal body and reducing an energy loss without forming a hole or a seam on the metal rear housing 3.

Figure 8:
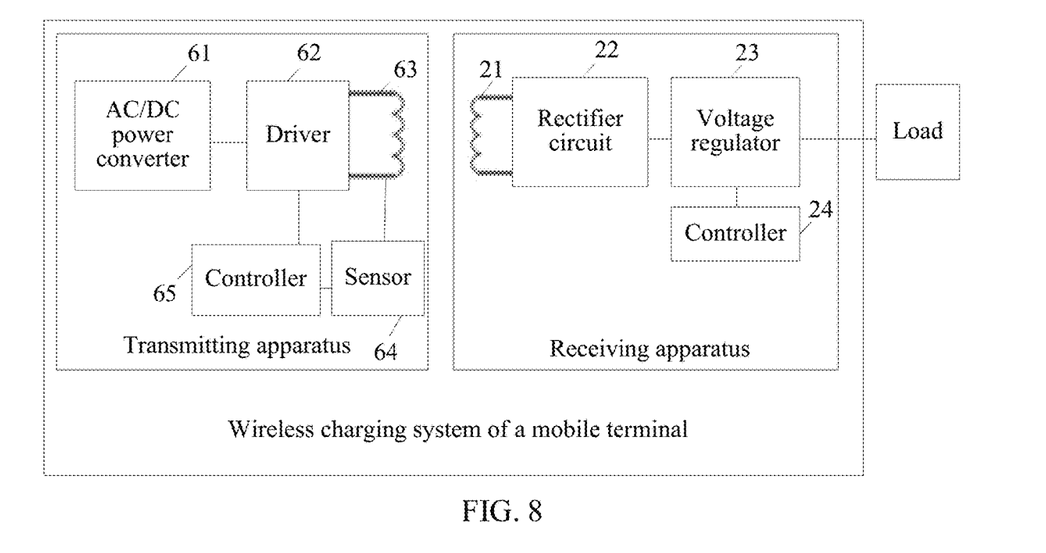
FIG. 8 is a schematic diagram of a wireless charging system of a mobile terminal according to another embodiment of the present invention.

FIG. 8 shows a wireless charging system of a mobile terminal according to some embodiments of the present invention, and the system includes a receiving apparatus and a transmitting apparatus. The transmitting apparatus may include an AC/DC power converter 61, a driver 62, a transmitting coil 63, a sensor 64, and a controller 65. The AC/DC power converter 61 converts the main AC power into a direct current. The receiving apparatus may include a wireless charging receiving coil 21, a rectifier circuit 22, a voltage regulator 23, and a controller 24. The transmitting coil 63 generates electromagnetic induction with the wireless charging receiving coil 21. The wireless charging receiving coil 21 generates electric energy in a magnetic field generated by the transmitting coil 63 of the wireless charging transmitting apparatus, and finally outputs a voltage to a load after regulation performed by the rectifier circuit 22 and the voltage regulator 23 under control of the controller 24. The receiving apparatus is disposed inside a mobile terminal device, for example, disposed inside a mobile phone. The transmitting apparatus is disposed on a wireless charger.

Figure 9:
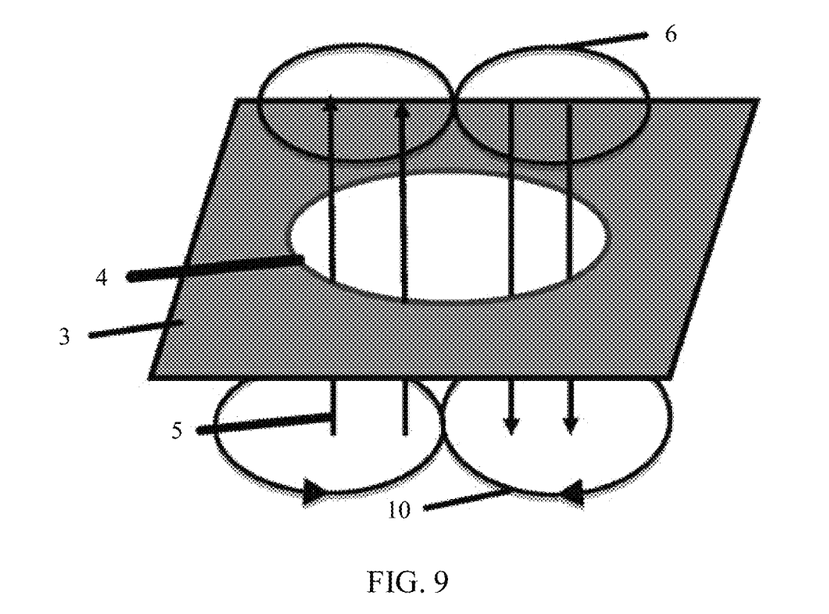
FIG. 9 is a schematic diagram of a magnetic circuit of a wireless charging system of a mobile terminal according to another embodiment of the present invention.

FIG. 9 is a schematic diagram of a magnetic circuit of a wireless charging system of a mobile terminal according to some embodiments of the present invention. A receiving apparatus and a transmitting apparatus respectively include a wireless charging receiving apparatus coil 6 and a wireless charging transmitting apparatus coil 10. The wireless charging receiving apparatus coil 6 and the wireless charging transmitting apparatus coil 10 each include two interconnected coils 701 and 702. The two coils 701 and 702 are located in a same plane and are connected in series, and winding directions of the two coils 701 and 702 are opposite. Electromagnetic induction is generated between the two coils of the receiving apparatus coil 6 and the two coils of the transmitting apparatus coil 10.

When a current flows through the two coils 701 and 702 connected in series, directions of magnetic fields generated by the two coils 701 and 702 are opposite, so that directions of magnetic fluxes of the magnetic fields generated by the two coils of the receiving apparatus coil 6 on a metal rear housing 3 of the mobile terminal are opposite, directions of magnetic fluxes of the magnetic fields generated by the two coils of the transmitting apparatus coil 10 on the metal rear housing 3 of the mobile terminal are opposite, and magnetic fluxes of the magnetic fields generated by the two coils on the metal rear housing 3 are the same.

In one embodiment, the mobile terminal further includes at least two of three components: a camera flash, a fingerprint recognition apparatus, or a camera; one of the two coils of the receiving apparatus coil 6 surrounds one of the three components: the camera flash, the fingerprint recognition apparatus, or the camera on the metal rear housing; and the other coil surrounds one of remaining two of the camera flash, the fingerprint recognition apparatus, or the camera, so that the two coils generate electromagnetic induction due to a magnetic field of the mobile terminal entering through a position of the camera flash, or the fingerprint recognition apparatus, or the camera. In one embodiment, the plane in which the two coils are located is parallel to the metal rear housing 3, and the two coils separately surround two of the camera flash, the fingerprint recognition apparatus, or the camera on the metal rear housing, where a distance between the two components is one of two smaller distances between the three components, so that the two coils generate electromagnetic induction with a magnetic field generated by a wireless charging transmitting apparatus that charges the mobile terminal.

In the wireless charging system, the coils 701 and 702 are disposed on the receiving apparatus and the transmitting apparatus, and the two coils generating electromagnetic induction are configured as interconnected coils. The two coils are located in the same plane and are connected in series, and the winding directions of the two coils are opposite, so that the directions of the magnetic fields generated by the two coils are opposite, thereby resolving a problem of an eddy current on the metal rear housing 3 of the mobile terminal such as a smartphone including the wireless charging system, and reducing a temperature of a metal body and reducing an energy loss without forming a hole or a seam on the metal rear housing 3.

The directions of the magnetic fields generated by the two coils 701 and 702 are opposite and magnitude of the magnetic fields is the same, so that the magnetic fluxes generated on the metal rear housing 3 counterbalance each other, to eliminate eddy currents generated by the two coils 701 and 702 on the metal rear housing 3. Specifically, the directions of the magnetic fields generated by the two coils of the receiving apparatus are opposite and magnitude of the magnetic fields is the same, and the magnetic fluxes generated by the coils of receiving apparatus on the metal rear housing 3 counterbalance each other. The directions of the magnetic fields generated by the two coils of the transmitting apparatus are opposite and magnitude of the magnetic fields is the same, and the magnetic fluxes generated on the metal rear housing 3 counterbalance each other Specially, especially when the two coils 701 and 702 of the coil 6 in the receiving apparatus are disposed at the camera on the metal rear housing 3 of the mobile terminal, and the camera is a dual camera 801 and 802, one of the two coils surrounds one camera of the dual camera, and the other coil surrounds the other camera of the dual camera. To be specific, the coil 701 corresponds to the camera 801, the coil 702 corresponds to the camera 802, and the two coils are parallel to a plane in which the dual camera is located, so that the two coils generate electromagnetic induction with a coil of a wireless charger.

Figure 10A:
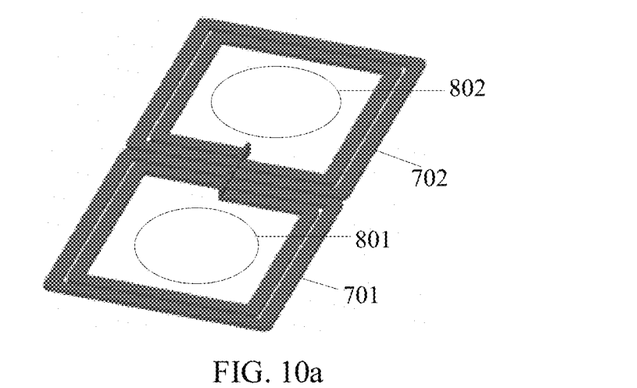
FIG. 10a is a schematic structural diagram of a wireless charging coil and a camera of a mobile terminal according to another embodiment of the present invention.
Figure 10B:
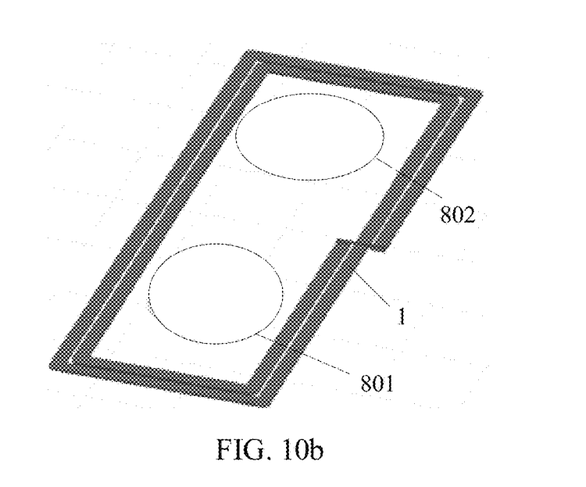
FIG. 10b is a schematic structural diagram of a single charging coil disposed on a camera of a mobile terminal.

FIG. 10a is a schematic structural diagram of a wireless charging coil and a camera of a mobile terminal according to another embodiment of the present invention, and FIG. 10b is a schematic structural diagram of a conventional single wireless charging coil in the prior art disposed on a camera of a mobile terminal. In FIG. 10a, an outer rectilinear frame represents a coil 7, including a coil 701 and a coil 702, and in FIG. 10b, a coil 1 is included. It may be learned from the figures that quantities of turns of the coils in the figures are 2. Middle circles represent cameras 801 and 802 on a mobile terminal device. On a basis of the structures shown in FIG. 10a and FIG. 10b, charging efficiency is analyzed.

Figure 11:
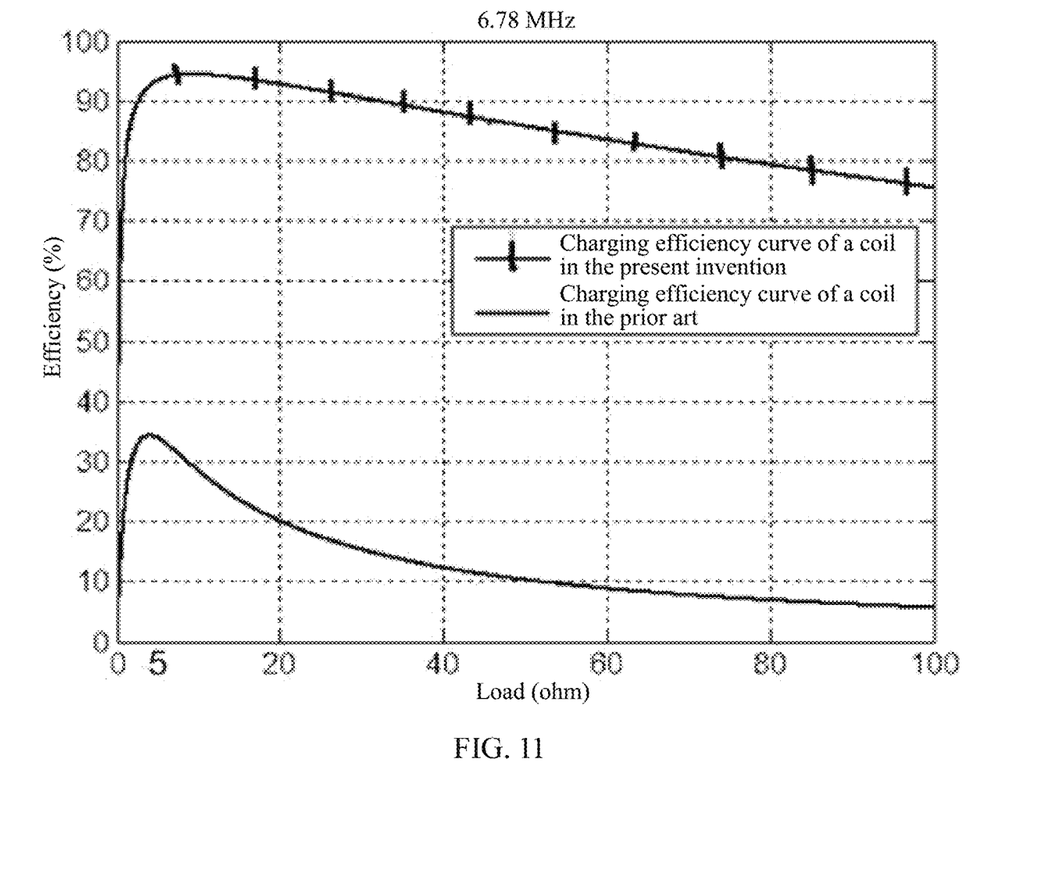
FIG. 11 is a diagram of wireless charging efficiency of a mobile terminal according to an embodiment of the present invention.

Charging efficiency of the foregoing two structures is analyzed, and a comparison result is shown in FIG. 11. FIG. 11 is a diagram of wireless charging efficiency of a mobile terminal according to some embodiments of the present invention. In this figure, a horizontal coordinate represents an ohm value of a wireless charging load, and a vertical coordinate represents a charging efficiency value. In some embodiments of the present invention, a wireless charging coil is two coils 701 and 702 that are in a cross-connection, and directions of currents of the two coils 701 and 702 are opposite, so that a total magnetic flux on a metal rear housing 3 is zero. When the coils in a structure similar to a butterfly structure or a figure-8 structure are at a high frequency (6.78 MHz), coupling between the coils is enhanced, and a quality factor of the coils is increased. The quality factor of the coil is a quality indicator of a ratio of energy stored in the coil to an energy loss per period. Transmission efficiency of a wireless charging system is finally increased.

Specifically, emulation and verification are used. For example, for a coil (as shown in FIG. 10a) having a butterfly structure or a figure-8 structure in this solution or a conventional single spiral coil (as shown in FIG. 10b), when a quantity of turns of the coil is 2, a thickness of the coil is 0.1 mm, a width of a conducing wire is 0.8 mm, a conductor spacing is 0.2 mm, a thickness of a magnetic material is 0.2 mm, and a magnetic permeability is 130, corresponding parameters are shown in the following table. When the conventional spiral coil is used, a length of a seam formed on the metal rear housing 3 is 15 mm, and a width is 0.1 mm, so that a magnetic field penetrates the metal rear housing 3 through the seam. When a working frequency is 6.78 MHz, parameters, such as a coupling factor of a transmitting coil and a receiving coil, a transmitting Q value of the transmitting coil, and a receiving Q value of the receiving coil, may be learned from the following table.

| Coil form | Frequency (MHz) | Transmitting inductance value (uH) | Receiving inductance value (uH) | Transmitting ACR (ohm) | Receiving ACR (ohm) | Coupling factor | Transmitting Q value | Receiving Q value | ω * M (ohm) |
|---|---|---|---|---|---|---|---|---|---|
| A butterfly coil and a seamless rear housing | 6.78 | 0.324 | 0.311 | 0.13 | 0.27 | 0.47 | 107 | 50 | 6.3 |
| A conventional coil and a seam formed on a rear housing | 6.78 | 0.28 | 0.113 | 0.66 | 1.95 | 0.27 | 18 | 2.5 | 2 |

Power transmission efficiency of the whole wireless charging system is calculated based on an equivalent circuit, as shown in FIG. 11. It may be learned that when a wireless charging system using the coil having the butterfly structure or the figure-8 structure charges a 5-ohm load (namely, a mobile terminal), the transmission efficiency is higher than 90%, and the wireless charging system is significantly superior to a wireless charging system using the conventional single spiral coil in the prior art.

It should be understood that when a charging terminal has the metal rear housing 3, a charging effect improvement of the present invention is greatest, however the rear housing is not particularly limited to the metal rear housing 3 in the present invention. The rear housing of the mobile terminal may alternatively be another material such as glass and plastic.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless charging receiving apparatus, wherein the wireless charging receiving apparatus is disposed inside a mobile terminal and close to a metal rear housing of the mobile terminal, wherein the wireless charging receiving apparatus comprises two interconnected coils, the two coils are located in a same plane and are connected in series, and winding directions of the two coils are opposite, so that directions of magnetic fluxes generated by the two coils on the metal rear housing are opposite, wherein the mobile terminal comprises a dual camera, wherein one of the two coils surrounds one camera of the dual camera.

2. The wireless charging receiving apparatus according to claim 1, wherein magnetic fluxes of magnetic fields generated by the two coils on the metal rear housing are the same, so that a total magnetic flux passing through the metal rear housing is zero.

3. The wireless charging receiving apparatus according to claim 1, wherein the plane in which the two coils are located is parallel to the metal rear housing.

4. A mobile terminal, comprising:
a wireless charging receiving apparatus, disposed inside the mobile terminal and close to a metal rear housing of the mobile terminal, wherein the wireless charging receiving apparatus comprises two interconnected coils, the two coils are located in a same plane and are connected in series, and winding directions of the two coils are opposite, so that directions of magnetic fluxes generated by the two coils on the metal rear housing are opposite, wherein the mobile terminal comprises a dual camera, wherein one of the two coils surrounds one camera of the dual camera.

5. The mobile terminal according to claim 4, wherein another one of the two coils surrounds another camera of the dual camera.

6. The mobile terminal according to claim 5, wherein the plane in which the two coils are located is parallel to the metal rear housing, wherein the two coils generate, through a position of the dual camera, electromagnetic induction with a magnetic field generated by a wireless charging transmitting apparatus that charges the mobile terminal, so that an energy loss is reduced when the magnetic field generated by the wireless charging transmitting apparatus penetrates the metal rear housing.

7. The mobile terminal according to claim 4, wherein the mobile terminal further comprises a camera flash and a fingerprint recognition apparatus; wherein the other coil surrounds the camera flash or the fingerprint recognition apparatus, so that the two coils generate electromagnetic induction due to a magnetic field of the mobile terminal entering through a position of the camera flash or the fingerprint recognition apparatus.

8. The mobile terminal according to claim 7, wherein the plane in which the two coils are located is parallel to the metal rear housing, wherein the two coils generate electromagnetic induction with a magnetic field generated by a wireless charging transmitting apparatus that charges the mobile terminal.

9. The mobile terminal according to claim 8, wherein a total magnetic flux generated by the two coils at a position of the metal rear housing of the mobile terminal other than the position at which the camera flash or the fingerprint recognition apparatus is disposed is zero, to eliminate an eddy current generated when the magnetic field generated by the wireless charging transmitting apparatus penetrates the metal rear housing.

10. The mobile terminal according to claim 4, wherein the two coils are identical coils.

11. A wireless charging transmitting apparatus, comprising:
a transmitting coil, wherein the transmitting coil comprises two interconnected coils, the two coils are located in a same plane and are connected in series, winding directions of the two coils are opposite, and wherein when a current flows through the two coils connected in series with each other, directions of magnetic fields generated by the two coils are opposite, so that when the wireless charging transmitting apparatus charges a mobile terminal, directions of magnetic fluxes passing through a metal rear housing of the mobile terminal are opposite, wherein the mobile terminal comprises a dual camera, wherein one of the two coils surrounds one camera of the dual camera.

12. The wireless charging transmitting apparatus according to claim 11, wherein magnetic fluxes of the magnetic fields generated by the two coils on the metal rear housing are the same.

13. The wireless charging transmitting apparatus according to claim 11, wherein the two coils are identical coils.

14. The wireless charging receiving apparatus according to claim 1, wherein the two coils are disposed at a position parallel to a position of a camera flash, a fingerprint recognition apparatus, or the dual camera on the metal rear housing.

15. The wireless charging receiving apparatus according to claim 1, wherein the two coils are arranged in one of a butterfly structure or a figure-8 structure, wherein the butterfly structure or the figure-8 structure comprises two single toroid coils that intersect.

16. The wireless charging receiving apparatus according to claim 15, wherein the toroid coils comprise one of a ring shape, an oval shape, or a rectangular shape.

17. The wireless charging receiving apparatus according to claim 1, wherein the two coils comprise identical coils.

18. The wireless charging receiving apparatus according to claim 1, wherein the two coils comprise different shapes or winding quantities, and wherein magnetic fluxes of magnetic fields generated by the two coils on the metal rear housing are the same.

19. The mobile terminal according to claim 4, wherein the two coils are arranged in one of a butterfly structure or a figure-8 structure, wherein the butterfly structure or the figure-8 structure comprises two single toroid coils that intersect.

20. The mobile terminal according to claim 4, wherein the two coils comprise different shapes or winding quantities, and wherein magnetic fluxes of magnetic fields generated by the two coils on the metal rear housing are the same.

* * * * *